United States Patent [19]

Nakamura et al.

[11] 4,261,793

[45] Apr. 14, 1981

[54] MULTISTAGE SPRAY DRYING METHOD FOR DETERGENT SLURRY

[75] Inventors: Masayoshi Nakamura, Koshigaya; Seizi Abe, Tokyo; Takeshi Arai, Kawasaki, all of Japan

[73] Assignee: The Lion Fat & Oil Co., Ltd., Tokyo, Japan

[21] Appl. No.: 735,501

[22] Filed: Oct. 26, 1976

[30] Foreign Application Priority Data

Oct. 31, 1975 [JP] Japan .............................. 50-131033

[51] Int. Cl.[3] .............................................. B01D 1/16

[52] U.S. Cl. .............................. 159/48 R; 159/4 CC; 252/536

[58] Field of Search ................. 159/4 C, 4 CC, 4 MS, 159/4 R, 48 R, DIG. 8, 10, 14; 252/536

[56] References Cited

U.S. PATENT DOCUMENTS

| | | | |
|---|---|---|---|
| 2,838,135 | 6/1958 | Pilo et al. | 159/4 MS |
| 3,629,951 | 12/1971 | Davis et al. | 159/4 CC |

*Primary Examiner*—Norman Yudkoff

*Attorney, Agent, or Firm*—Blanchard, Flynn, Thiel, Boutell & Tanis

[57] ABSTRACT

A method is provided for spray drying a detergent slurry in a spray drying chamber having at least two different levels of uniformly spaced atomizing nozzles, which slurry consists of about 50 to 70% by weight of solid constituent comprising 20 to 40% by weight of active ingredient containing an anionic surfactant, 5 to 30% by weight of water-soluble silicate and at most 21% by weight of phosphate builder and about 50 to 30% by weight of water. The lower stage of the two adjoining spraying stages is positioned at a point in the spray drying chamber where the moisture content of the particles sprayed from the upper spraying stage becomes less than about 25% by weight. The lowest spraying stage is positioned at a point in the spray drying chamber which is at a temperature of from higher than the boiling point of the detergent slurry to less than 200° C. From 30 to 70% of the slurry is sprayed from said lowest stage. There can be obtained a granular detergent which is an excellent granular material by this method.

4 Claims, 1 Drawing Figure

MULTISTAGE SPRAY DRYING METHOD FOR DETERGENT SLURRY

BACKGROUND OF THE INVENTION

This invention relates to a multistage spray drying method for a detergent slurry, and particularly it relates to a multistage spray drying method for a detergent slurry comprising a relatively high content of a surfactant as active ingredient and a low content of a phosphate builder.

For obtaining a granular detergent from a detergent slurry, the spray drying method is generally used. In this method a detergent slurry is continuously spray-dried within a drying chamber wherein the temperature is maintained above 70° C. Two types of spray drying methods are known. The first has a single spraying stage in which the spray nozzle is positioned in the top of the drying chamber, and the second has plural spraying stages. The single stage spray drying method has been generally used for the spray drying of a detergent slurry containing relatively high content of phosphate builder, and for drying a detergent slurry of this kind, it is possible to obtain a suitable granular detergent. However, in the case of spray drying a detergent slurry containing a low content of phosphate builder, mass production of a granular detergent having a desirable property is difficult by the single stage spray drying method.

Generally speaking, in the detergent manufacturing industry, to meet the restriction on the use of tripolyphosphate as well as the demand for economy of energy and resources, strenuous efforts are being directed to the development of a detergent which can minimize the standard amount of tripolyphosphate that is used. As a suitable detergent, the so-called compact low-phosphate detergent containing a relatively high content of surfactant and a low content of phosphate is being studied. However, in the case of manufacturing said compact low-phosphate detergent by the aforesaid single stage spray drying method, unless the amount of the slurry to be sprayed per unit time is remarkably decreased, it is difficult to produce a granular detergent having the necessary properties for a granular detergent. Under such circumstances, for the purpose of manufacturing a compact low-phosphate detergent, the foregoing multistage spray drying method may be preferably used.

In Japanese Pat. No. 3787/1972 there is disclosed a multistage spray drying method for a detergent slurry. In this method, the lowest level of the spray nozzles is located at below the isotherm of 88° C. and above the isotherm of boiling point of the slurry. From 30 to 80% of the detergent slurry is sprayed from this lowest spraying stage, and the remainder is sprayed from the stage(s) disposed above the isotherm of 88° C. According to the disclosure, by this multistage spray drying method, degradation of tripolyphosphate in spray drying can be minimized and fine powder and by-production of coarse powder can be decreased whereby a granular detergent of uniform size can be manufactured. This Japanese Pat. No. 3787/1972 further teaches that from the detergent slurry prepared by replacing a part or the entirety of tripolyphosphate with another builder, it is possible to obtain a satisfactory granular detergent by this multistage spray drying method. However, the result of a follow-up test of said multistage spray drying method actually conducted by the use of a detergent slurry containing a low-content of tripolyphosphate, for example, a detergent slurry containing less than 25% by weight of tripolyphosphate (dry basis), shows that as long as the ordinary amount of slurry per unit time is sprayed, it is impossible to obtain a granular detergent having scarcely agglomerated granules, and even when a lower amount of slurry per unit time is sprayed, the dry granules of the resulting detergent are apt to cake easily under dead load. Furthermore they tend to get pulverized with the passing of time.

SUMMARY OF THE INVENTION

The object of the present invention is to improve the above discussed multistage spray drying method and to provide an improved multistage spray drying method which renders it possible to prevent the agglomeration of particles without decreasing the amount of slurry to be sprayed per unit time and to manufacture a granular detergent which is satisfactory in fluidity, shows little change of bulk density with the passing of time and has a good loosenability of caking pieces. The term 'loosenability of caking pieces' herein means the property that caked granular detergent formed under dead load revert to the original individual granules. It is evaluated on the basis of the force required for effecting the reversion. Generally speaking, this loosenability of caking pieces is affected by many factors such as the tackiness, shape, mechanical strength, size distribution, etc. of the granules.

In the aforesaid compact low-phosphate detergent, lowering of the detergency by decreasing the content of tripolyphosphate is compensated for by increasing mainly the content of surfactant and alkai builder. In the case of a compact low-phosphate detergent of this kind manufactured by the spray drying method, there are generally formed large quantities of agglomerated granules. The reason is that both the decrease of the amount of tripolyphosphate and the increase of the amount of surfactant accelerate the agglomeration of granules.

Based on this knowledge, the present inventors have found that there is a definite relation between the moisture content of the sprayed slurry and the moisture evaporation rate thereof and also the degree of dryness of the surfaces of the particles is closely connected with the tackiness of their surfaces and, by adjustment of the relative positions of the respective spraying stages within the spray drying chamber by utilizing these relations, a compact low-phosphate granular detergent is obtained by spray drying without giving rise to appreciable agglomeration of the granules.

Figure 1:
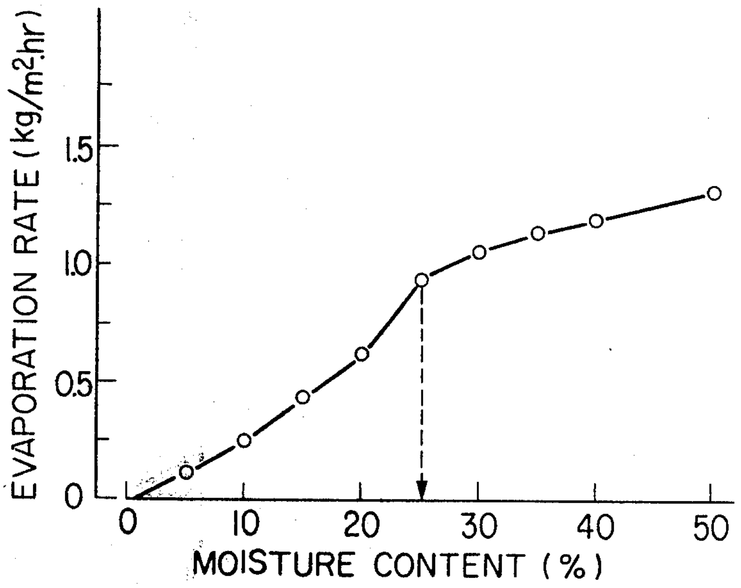
FIG. 1 is a graph showing the relationship between moisture content and evaporation rate for a detergent slurry as set forth in the following description.
Figure 2:
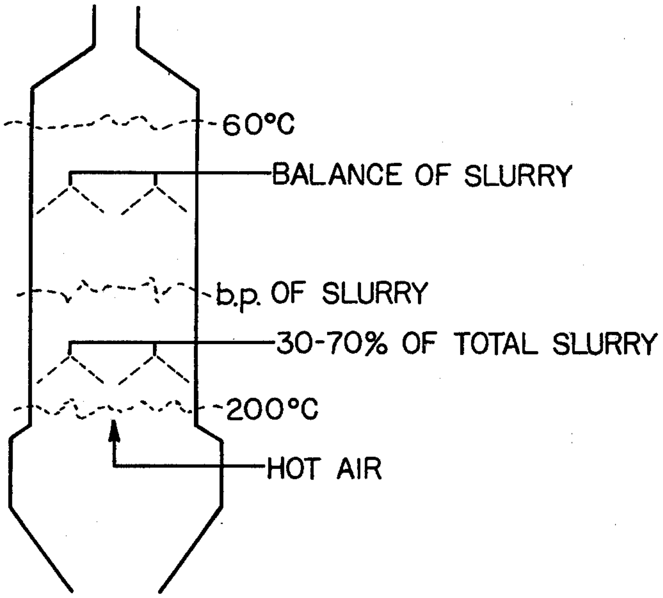
FIG. 2 is a schematic view of a spray drying tower having two spraying stages.

A detergent slurry is prepared by admixing 15 parts by weight of sodium linear alkylbenzene sulfonate, 10 parts by weight of sodium $C_{15}$–$C_{18}$ α-olefin sulfonate, 15 parts by weight of sodium silicate (JIS No. 1), 20 parts by weight of sodium tripolyphosphate, 30 parts by weight of sodium sulfate, 2 parts by weight of CMC plus optical brightener and 92 parts by weight of water and this slurry is put in an appropriate evaporating tray and is dryed in an atmosphere maintained constantly at 120° C. The relation between the moisture content of the detergent slurry and the moisture evaporation rate thereof is found by measuring the change of the weight of the detergent slurry with the evaporation of moisture, and there can be observed such a relation as illustrated in the appended graph. As is evident from the graph, the moisture evaporation rate is not constant even under the condition of a constant temperature, that is, it varies with the moisture content of the detergent slurry. When the moisture content is below 25 wt. %, the moisture evaporation rate declines sharply. Examination of the surface of the detergent slurry having a moisture content of about 25 wt. %, shows that little moisture remains on its surface and tackiness is scarcely observed.

Although the foregoing knowledge is a result of an experiment conducted by drying a detergent slurry placed in an evaporating tray, even in the case of spray drying, the occurrence of the evaporation of moisture from the surface of sprayed particles is the same as in the case of the drying of detergent slurry using an evaporating tray. Accordingly, even in the case of drying a slurry for compact low-phosphate detergent which is apt to give rise to agglomerated particles, the knowledge obtained from the foregoing experiment can be applied practically as it is.

The multistage spray drying method under the present invention is based on the above knowledge and is characterized in that, in conducting the spray drying of a detergent slurry composed of about 50–70 parts by weight of solid matter comprising 20–40 wt. % of an active ingredient containing anionic surfactant, 5–30 wt. % of silicate and at most 21 wt. % of phosphate builder and about 50–30 parts by weight of water from each spraying stage, the lower stage of two adjoining spraying stages is disposed in a zone where the moisture content of particles sprayed from the upper spraying stage becomes about not more than 25 wt. %, the lowest spraying stage is disposed in a zone wherein the temperature range is from higher than the boiling point of the slurry to less than 200° C., and the amount of slurry sprayed from the lowest spraying stage is regulated to be 30–70 wt. % of the whole amount of slurry to be sprayed.

Generally, multistage spray drying apparatuses are equipped with at least 2 spraying stages having plural atomizing nozzles and arranged substantially at regular intervals on a horizontal level, and the detergent slurry sprayed from each spraying stage contacts, in countercurrent flow, the hot air arising within the apparatus.

According to the present invention, to begin with, the lower stage of two adjoining spraying stages must be disposed in a zone where the moisture content of the particles sprayed from the upper spraying stage becomes about not more than 25 wt. %. That is to say, in the case of practicing the method of the present invention by employing a triple-stage spray drying apparatus, the 2nd spraying stage should be disposed in a zone where the moisture content of the particles sprayed from the 1st spraying stage (or the highest stage) becomes at most 25 wt. % and the 3rd spraying stage (or the lowest stage) should be disposed in a zone where the moisture content of particles sprayed from the 2nd spraying stage becomes at most 25 wt. %.

In the multistage spray drying method according to the present invention, the amount of the detergent slurry to be sprayed from the lowest spraying stage must be regulated to be essentially in the range of 30–70 wt. % based on the whole amount of slurry to be sprayed. Accordingly, the remainder of the detergent slurry is sprayed from spraying stages other than the lowest spraying stage. The amount of the detergent slurry to be sprayed from such other stages is desirably at least 20 wt. % of the whole amount of slurry to be sprayed, respectively. Besides, the amount of the detergent slurry to be sprayed from the highest stage is desirably equivalent to 25–60 wt. % of the whole amount of slurry to be sprayed. In this context, in the case where the amount of the detergent slurry to be sprayed from the highest stage exceeds 40 wt. % of the whole amount of slurry to be sprayed, it is desirable to provide auxiliary atomizing nozzles disposed above the highest spraying stage so as to spray less than one quarter of the detergent slurry to be supplied to the highest spraying stage from said auxiliary atomizing nozzles.

According to the present invention, the lowest spraying stage must be disposed in a zone held at a temperature ranging from higher than the boiling point of the detergent slurry to less than 200° C. The reason is that, at the time of contact between the detergent slurry sprayed from the lowest stage and the hot air is shorter, it is difficult to effect sufficient drying of particles at a temperature lower than the boiling point of the detergent slurry, whereas at a temperature higher than 200° C., even though the said contact time is short, there is a fear of degradation of the tripolyphosphate. As stated in the foregoing, in the multistage spray drying method, the sprayed particles come in contact, in countercurrent flow, with rising from hot air. Accordingly, there takes place a temperature gradient within the drying apparatus and the temperature within the drying apparatus comes to be lower at the top portion relative to the bottom portion, and a relatively higher spraying stage is positioned in a relatively lower temperature zone. In practicing the method of the present invention, it is desirable to maintain the temperature of the highest spraying stage in the range of from more than 60° C. to less than the boiling point of the detergent slurry: in the case where it is less than 60° C., the drying rate of the sprayed particles will be extremely low, while in the case where it is more than the boiling point of the detergent slurry, the heat loss will be great. As for the 2nd spraying stage (excluding the lowest stage), however, it is preferable to dispose it in a zone held at a temperature higher than the boiling point of the detergent slurry in practicing the method of the present invention.

As regards the detergent slurry to be used in the present invention, it consists of about 50–70 parts by weight of solid matter and about 50–30 parts by weight of water, said solid matter comprising 20–40 wt. % of at least one kind of surface active agent containing anionic surface active agent, 5–30 wt. % of silicate and not more than 21 wt. % of phosphate builder. As the anionic surface active agent for this purpose, alkali metal salts of alkylbenzene sulfonate, alkyl sulfate, α-olefin sulfonate, alkyl ethoxysulfate, monoacyl glyceryl sulfate, acyloxyethane sulfonate, N-acyl-N-methyl tauride, fatty acid and etc. are useful, but from the viewpoint of the detergency of the resulting detergent, the use of α-olefin sulfonate is preferable.

The foregoing anionic surface active agents can be used jointly with a non-ionic surface active agent and/or an amphoteric surface active agent. To cite applicable non-ionic surface active agents, there are, for instance, alkyl ethoxylate, alkyl phenyl ethoxylate, tertiary alkylamine oxide, etc., and to cite applicable amphoteric surface active agents, there are, for instance, alkyl dimethyl sulfopropyl ammonium, alkyl dimethyl carboxymethyl ammonium, N-acylaminoalkyl-N-hydroxyalkyl aminocarboxylate and etc.

As the silicate for use in the present invention, those silicates which are commonly used in general granular detergents are useful. The appropriate amount of silicate to be employed is in the range of 5–30 wt. % based on the amount of solid matter in the detergent slurry (dry basis). It is usual to apply sodium silicate. As for the amount of phosphate in the detergent slurry it is preferable to be less than 12 wt. % in terms of $P_2O_5$, the amount of tripolyphosphate to be employed in the present invention is superposed to be less than 21 wt. %, and sodium tripolyphosphate is generally applied.

In addition to the above components, other ingredients applicable to the conventional granular detergents, for instance, such builders as carbonate, bicarbonate, borate, citrate, tartrate, nitrilotriacetate, etc. may be admixed in the solid matter constituting the detergent slurry of the present invention, if necessary. Moreover, anti-redeposition agent, optical brightener, coloring agent, anti-caking agent, etc. may be used as ingredients of the solid matter, if necessary.

As will be understood from the above description, according to the multistage spray drying method of the present invention, by-production of agglomerated particles can be minimized and a compact low-phosphate detergent can be manufactured. Besides, the dry particles obtained by the method of the present invention have excellent properties suitable for use as granular detergents, such as satisfactory fluidity, freedom from variation of bulk density with the passing of time and superior loosenability of caked pieces, coupled with a satisfactory water solubility. Moreover, according to the method of the present invention, not only is the content of fine powder and coarse powder kept low, but also the degradation of tripolyphosphate can be minimized, even though a large amount of detergent slurry is spray dried in a zone held at a temperature higher than the boiling point thereof. Furthermore, the method of the present invention manifests an excellent effect because it makes it possible to manufacture a superior granular detergent as above without lessening the amount of detergent slurry sprayed per unit time.

DESCRIPTION OF THE PREFERRED EMBODIMENTS

Four varieties of detergent slurries having the following composition, respectively, were prepared.

(1) slurry A (solid matter: 62 wt. %, moisture: 38 wt. %) composition of solid matter:

| | |
|---|---|
| sodium linear alkylbenzene sulfonate | 15 wt.% |
| sodium α-olefin sulfonate | 10 wt.% |
| sodium silicate | 15 wt.% |
| sodium tripolyphosphate | 20 wt.% |
| CMC + optical brightener | 2 wt.% |
| sodium sulfate | balance |

(2) slurry B (solid matter: 62 wt. %, moisture: 38 wt. %) composition of solid matter:

| | |
|---|---|
| sodium linear alkylbenzene sulfonate | 25 wt.% |
| sodium α-olefin sulfonate | 10 wt.% |
| sodium silicate | 15 wt.% |
| sodium tripolyphosphate | 20 wt.% |
| CMC + optical brightener | 2 wt.% |
| sodium sulfate | balance |

(3) slurry C (solid matter: 59 wt. %, moisture: 41 wt. %) composition of solid matter:

| | |
|---|---|
| sodium linear alkylbenzene sulfonate | 10 wt.% |
| sodium α-olefin sulfonate | 20 wt.% |
| sodium silicate | 10 wt.% |
| sodium tripolyphosphate | 20 wt.% |
| CMC + optical brightener | 1.5 wt.% |
| sodium sulfate | balance |

(4) slurry D (solid matter: 62 wt. %, moisture 38 wt. %) composition of solid matter:

| | |
|---|---|
| sodium linear alkylbenzene sulfonate | 10 wt.% |
| sodium α-olefin sulfonate | 15 wt.% |
| sodium silicate | 20 wt.% |
| sodium tripolyphosphate | 7 wt.% |
| sodium carbonate | 10 wt.% |
| CMC + optical brightener | 2 wt.% |
| sodium sulfate | balance |

The foregoing 4 slurries were spray dried according to the method of the present invention, and the properties of the resulting dry particles were examined. The conditions for spray drying and the properties of the dry particles were as shown in the following table.

| Test No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| slurry employed | A | A | A | A | A | A | A | A | A | A | A | B | C | D | A |
| No. of spraying stage | 2 | 2 | 2 | 2 | 2 | 2 | 2 | 2 | 2 | 3 | 3 | 2 | 2 | 2 | 1 |
| No. of nozzles for 1st stage | 3 | 2 | 4 | 2 | 4 | 4 | 4 | 6 | 2 | 2 | 2 | 4 | 4 | 4 | 8 |
| No. of nozzles for 2nd stage | 6 | 6 | 4 | 5 | 4 | 4 | 4 | 2 | 6 | 4 | 3 | 4 | 4 | 4 | — |
| No. of nozzles for 3rd stage | — | — | — | — | — | — | — | — | — | 4 | 3 | — | — | — | — |
| moisture content of particles passing 2nd stage (%) | 28 | 28 | 24 | 24 | 20 | 15 | 24 | 24 | 24 | 23 | 20 | 24 | 24 | 24 | — |
| temperature of 2nd stage (°C.) | 105 | 96 | 126 | 98 | 135 | 150 | 130 | 150 | 105 | 95 | 107 | 120 | 135 | 135 | — |
| temperature of 3rd stage (°C.) | — | — | — | — | — | — | — | — | — | 137 | 158 | — | — | — | — |
| hot air outlet temperature (°C.) | 80 | 75 | 75 | 75 | 75 | 75 | 75 | 75 | 80 | 75 | 75 | 72 | 80 | 80 | 86 |
| hot air inlet temperature (°C.) | 400 | 400 | 392 | 381 | 386 | 396 | 392 | 392 | 400 | 392 | 400 | 385 | 400 | 400 | 398 |
| spraying capacity (kg/hr) | 6000 | 6200 | 6000 | 5800 | 5900 | 6100 | 6000 | 6000 | 6000 | 6000 | 6200 | 5700 | 5460 | 5460 | 5800 |
| moisture of dry | | | | | | | | | | | | | | | |

-continued

| Test No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| particles (%) | 8.0 | 8.0 | 8.0 | 8.0 | 8.0 | 8.0 | 8.0 | 8.0 | 8.0 | 8.0 | 8.0 | 9.0 | 8.0 | 8.0 | 8.0 |
| bulk density (g/cc) | 0.27 | 0.28 | 0.28 | 0.28 | 0.27 | 0.26 | 0.28 | 0.28 | 0.29 | 0.28 | 0.29 | 0.29 | 0.27 | 0.27 | 0.25 |
| anti-caking property on dead load (kg) | 3.1 | 3.2 | 1.51 | 3.1 | 1.56 | 1.59 | 1.55 | 1.95 | 2.82 | 2.95 | 1.55 | 1.65 | 1.92 | 1.98 | 3.6 |
| variation of height by vibration (mm) | 25 | 26 | 10 | 25 | 12 | 12 | 13 | 25 | 23 | 22 | 12 | 11 | 15 | 17 | 30 |
| angle of repose (degree) | 60 | 65 | 45-50 | 60 | 45-50 | 45-50 | 45-50 | 55 | 50 | 55-60 | 45 | 45 | 50-55 | 50-55 | 70 |
| amount of particles rest of 16 mesh (%) | — | — | 0.5 | — | 0.6 | — | — | 5.5 | 5.0 | 5.0 | 0.7 | 0.8 | 1.5 | 2.0 | 7.5 |
| amount of particles passing 100 mesh (%) | — | — | 6.5 | — | 6.0 | — | — | 5.0 | 5.5 | 5.0 | 6.0 | 5.5 | 6.0 | 6.5 | 6.0 |
| water solubility (sec) | — | — | 30 | — | — | — | 35 | — | — | — | — | — | — | — | 90 |

(Remarks)
(1) In test No. 7, one auxiliary nozzle was disposed above the 1st spraying stage and the slurry was sprayed from this nozzle too.
(2) In test No. 15, a single stage dry spraying apparatus was employed.

The anti-caking property on dead load and variation of height by vibration in the above table were evaluated by the following methods, respectively.

anti-caking property on dead load:

Upon preparing a test piece by packing granules in a cylindrical receptacle having an inside diameter of 10 cm and depth of 15 cm and holding them into a rod under a load of 5 kg, the load (kg) required for breaking this test piece was measured.

variation of height by vibration:

Upon packing granules in a detergent carton (measuring 22 cm×15.5 cm×5.5 cm), the carton containing the granules was vertically vibrated at an amplitude of 3 cm for 30 minutes, and the degree of sinking (mm) of granules thereafter was evaluated.

As is evident from the above table, according to the method of the present invention, dry granules having an excellent property of granular state suitable for use as granular detergent can be manufactured.

What is claimed is:

1. A continuous method for spray-drying a detergent slurry in a vertical spray drying tower having at least two vertically spaced-apart spraying stages, each spraying stage comprising a plurality of atomizing nozzles arranged at substantially regular intervals on a horizontal level inside said tower, comprising the steps of:

preparing an aqueous detergent slurry consisting of from 50 to 70 parts by weight of solids and from 50 to 30 parts by weight of water, said solids comprising from 20 to 40 wt. % of surfactant component containing an anionic surface active agent, from 5 to 30 wt. % of silicate and less than 21 wt. % of phosphate builder;

continuously flowing heated drying air upwardly through said spray drying tower;

continuously spraying from 30 to 70 wt. % of the total amount of said detergent slurry into said tower from the lowermost one of said spraying stages which lowermost spraying stage is located at a horizontal level in said tower whereat the internal temperature of said tower is higher than the boiling point of said slurry and less than 200° C., and simultaneously continuously spraying the balance of said detergent slurry from the higher spraying stage or stages into said tower so that the sprayed-in detergent slurry flows downwardly from said spraying stages countercurrent to said drying air and is dried thereby to form particles, the spraying stages being located so that the particles formed by drying the portion of said detergent slurry sprayed into said tower at each spraying stage, except said lowermost spraying stage, are dried to a moisture content of 25 wt. % or lower before said particles reach the next adjacent lower spraying stage in said tower.

2. A method according to claim 1 in which from 25 to 60 wt. % of the total amount of said detergent slurry is sprayed into said tower from the uppermost one of said spraying stages.

3. A method according to claim 1 in which the uppermost spraying stage is located at a horizontal level in said tower whereat the internal temperature of said tower is higher than 60° C. and less than the boiling point of said slurry.

4. A method according to claim 1 in which said anionic surface active agent comprises α-olefin sulfonate.

* * * * *